United States Patent
Nowell

[15] 3,707,684
[45] Dec. 26, 1972

[54] ERROR AMPLIFIER FOR SWITCHING REGULATOR

[72] Inventor: John R. Nowell, Phoenix, Ariz.

[73] Assignee: Honeywell Information Systems, Inc., Waltham, Mass.

[22] Filed: Nov. 22, 1971

[21] Appl. No.: 200,675

[52] U.S. Cl. .................330/9, 330/20, 330/40, 330/24
[51] Int. Cl. ..............................H03f 1/02
[58] Field of Search ..............330/20, 40, 9 C

[56] References Cited

UNITED STATES PATENTS

2,866,018  12/1958  Bell ............................330/9
3,678,402  7/1972  Tempel ........................330/9

Primary Examiner—Nathan Kaufman
Attorney—Lloyd B. Guernsey et al. and Edward W. Hughes

[57] ABSTRACT

A differential amplifier compares the voltage from a switching regulator with a constant voltage and provides an output current having a value which is determined by the voltage from the switching regulator. A feedback circuit limits the rate at which the output current increases when the voltage from the switching regulator drops suddenly. Another circuit disables the amplifier and provides a fixed value of output current when the switching regulator is initially turned on.

8 Claims, 4 Drawing Figures

ERROR AMPLIFIER FOR SWITCHING REGULATOR

BACKGROUND OF THE INVENTION

This invention relates to an error amplifier for sensing the voltage at the output terminal of a switching regulator and for providing a current having a value which is determined by the value of the voltage from the regulator. This invention relates more particularly to an error amplifier which uses a feedback circuit to protect the switching regulator by limiting the rate of increase of output current when the voltage from the regulator drops suddenly. The amplifier uses another circuit to protect the regulator on start-up by providing a fixed value of output current when the switching regulator is initially turned on.

In high speed data processing systems switching regulators may be used to provide D.C. power to electronic circuits in the system. These regulators are smaller and more efficient than prior art power supplies so that the regulators may be located in the cabinets which contain the circuits rather than in a separate cabinet as required when prior art power supplies are used. Location of regulators near the circuits greatly reduces the length of cables which distribute the current to the circuits and reduces the amount of error signals which may be caused by variation in voltage in long cables.

The switching regulator may employ a transformer, a pair of silicon controlled rectifiers and a source of signals to convert an unregulated D.C. voltage, such as 150 volts, to an accurately regulated voltage, such as 5 volts. The silicon controlled rectifiers are employed as switches between the source of unregulated D.C. voltage and the transformer. The silicon controlled rectifiers are located on the high-voltage side of the transformer where the current and power losses in these rectifiers are low, thereby causing the switching regulator to have a high degree of efficiency. The regulated D.C. voltage obtained from a secondary winding on a transformer is supplied to a pair of voltage output terminals. The transformer provides isolation between the regulated D.C. voltage and the source of unregulated D.C. voltage so that a short circuit in a silicon controlled rectifier will not cause damage to the microcircuit modules which provide the load on the switching regulator.

The silicon controlled rectifier is a semi-conductor device having an anode, a cathode and a gate. The silicon controlled rectifier can be used as an ON-OFF switch which can be turned on in a very few microseconds. Normally, the silicon controlled rectifier cannot conduct current between anode and cathode thereof until a pulse of current larger than a threshold value flows from gate to cathode. If a positive voltage difference exists between the anode and the cathode when a pulse of current flows into the gate, the silicon controlled rectifier "fires;" i.e., is rendered conductive and a current will flow from the anode to the cathode. The rate at which the current flow from anode to cathode increases when the silicon controlled rectifier fires must be limited to prevent damage to the rectifier. Once anode-cathode flow commences, the gate has no further control over such current flow. Current flow from anode to cathode in a rectifier can be terminated only by reducing the anode to cathode current below a "holding" or minimum current value. A more detailed description of the operation of a silicon controlled rectifier can be found in the "Silicon Controlled Rectifier Manual," 4th edition, 1967, published by the General Electric Company, Syracuse, New York.

An error amplifier is coupled to the voltage output terminals of the switching regulator and develops an output current whose value is determined by the value of the voltage at the voltage output terminals. The current from the error amplifier is applied to a rate generator which develops trigger signals whose frequency is determined by the value of the current from the error amplifier. The trigger signals are coupled to the silicon controlled rectifiers in the switching regulator and cause these rectifiers to deliver energy through the transformer to output filter capacitors which are connected to the voltage output terminal. The error amplifier and the rate generator sense any change in the value of the regulated output voltage and cause a change in the frequency of the trigger signals delivered to the switching regulator.

Prior art error amplifiers provide a current having a value which is determined by the value of the voltage at the output terminal of the switching regulator. This current causes a rate generator to develop trigger signals having a frequency which is determined by the current from the error amplifier. These trigger signals are applied to the gates of the silicon controlled rectifiers in the switching regulators. When the voltage at the output terminals of the switching regulator decreases rapidly the current provided by the prior art error amplifiers increases rapidly thereby causing the frequency of the trigger pulses from the rate generator to increase to a relatively high value. If the frequency of the rate generator pulses is too high one of the pulses from the rate generator may cause a silicon controlled rectifier to be rendered conductive before another one of the silicon controlled rectifiers is rendered nonconductive. When two of the silicon controlled rectifiers in the switching regulator are conductive at the same time an excessively high current may flow through these silicon controlled rectifiers thereby causing damage to the rectifiers. What is needed is a combination of an error amplifier and a rate generator which will not allow more than one of the silicon controlled rectifiers to be rendered conductive at the same time.

The present invention provides an error amplifier having a feedback circuit which limits the maximum amount of current provided by the amplifier when the voltage at the output terminal of the switching regulator decreases rapidly. The present invention also provides a circuit which limits the current from the error amplifier when the power is initially applied to the switching regulator. The limited value of current from the error amplifier produces a limit on the upper frequency of the rate generator and prevents damage to rectifiers in the switching regulator.

It is, therefore, an object of this invention to provide an error amplifier which provides an output current having a value which is determined by the value of the voltage from a power supply.

Another object of this invention is to provide an error amplifier which produces a limited value of output current when the power supply is initially energized.

A further object of this invention is to provide an error amplifier which produces a limited value of output current when a low impedance load is connected to the power supply.

Still another object of this invention is to provide an error amplifier which produces an output current having a value which changes relatively slowly when the value of the power supply voltage changes suddenly.

SUMMARY OF THE INVENTION

The foregoing objects are achieved in the present invention by providing a new and improved error amplifier which develops a current having a value which is determined by the voltage from the output terminals of the switching regulator. A feedback circuit in the error amplifier prevents a sudden decrease in the voltage of the switching regulator from causing a sudden increase in the output current from the error amplifier. Another circuit of the error amplifier provides a limited value of output current when the switching regulator is initially energized and also provides a limited value of current when a low impedance load is connected to the switching regulator.

Other objects and advantages of this invention will become apparent from the following description when taken in connection with the accompanying drawings.

DESCRIPTION OF THE PREFERRED EMBODIMENT

Figure 1:
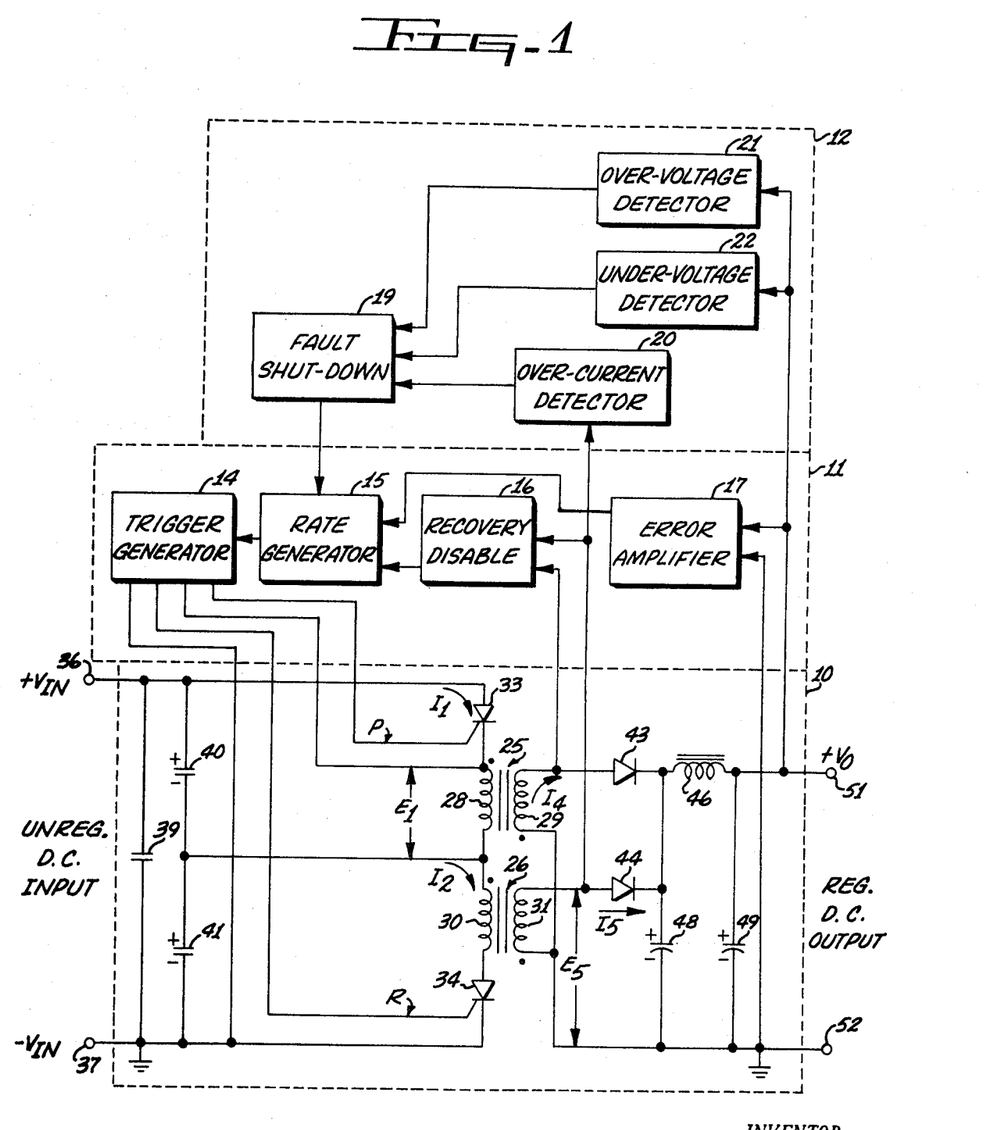
FIG. 1 is a schematic drawing of the switching regulator and its associated control circuits including the present invention.

Referring more particularly to the drawings by the characters of reference, FIG. 1 discloses a power supply system which is designed to provide a constant supply of D.C. output voltage for a wide range of values of output current and for monitoring the current delivered to a load which may be connected to the system. As indicated in FIG. 1, the system comprises a switching regulator 10, a switching regulator control circuit 11 for providing trigger signals to switching regulator 10, and a circuit 12 for monitoring the current and the voltage delivered by the power supply. The switching regulator control circuit 11 comprises a trigger generator 14, a rate generator 15, a recovery disable circuit 16 and an error amplifier 17. The error amplifier 17 detects any change in voltage at the output terminals of the switching regulator and provides a signal whose value is determined by the change in the output voltage. The signal from the error amplifier 17 causes the rate generator 15 to develop pulses having a frequency which is determined by the value of the signal from the amplifier 17. Pulses from the rate generator cause the trigger generator 14 to develop trigger pulses for the switching regulator. The recovery disable circuit 15 senses the time that output current is being delivered by the switching regulator to the output filter capacitors and prevents the rate generator from delivering pulses during the time that the current is being delivered.

The over-current detector 20, the over-voltage detector 21 and the under-voltage detector 22 sense any abnormal values of current or voltage at the output of the switching regulator and provide signals to the fault shutdown circuit 19. When the fault shutdown circuit 19 receives a signal from any of the detectors 20, 21 and 22 it provides a signal to the rate generator which disables the rate generator and prevents any pulses from being supplied to trigger the switching regulator.

Switching Regulator

As indicated in FIG. 1, switching regulator 11 includes a pair of transformers 25 and 26, each having a primary winding and a secondary winding. The primary windings 28 and 30 are connected in series and are coupled to the high voltage unregulated D.C. power supply having a positive output terminal 36 and a negative output terminal 37. A pair of silicon controlled rectifiers 33 and 34 control the current supplied by the power supply to the primary windings of transformers 25 and 26. The anode of silicon controlled rectifier 33 is connected to the positive terminal 36 of the unregulated D.C. power supply and the cathode of silicon controlled rectifier 33 is connected to the upper end of primary winding 28. The gate of silicon controlled rectifier 33 is connected to one lead of the trigger generator 14 which provides trigger signals to render rectifier 33 conductive. The anode of silicon controlled rectifier 34 is connected to the lower end of primary winding 30 and the cathode of silicon controlled rectifier 34 is connected to the negative terminal of the unregulated D.C. power supply. A second lead from the trigger generator 14 is connected to the gate of silicon controlled rectifier 34 to provide trigger signals to render rectifier 34 conductive.

Figures 2, 3:
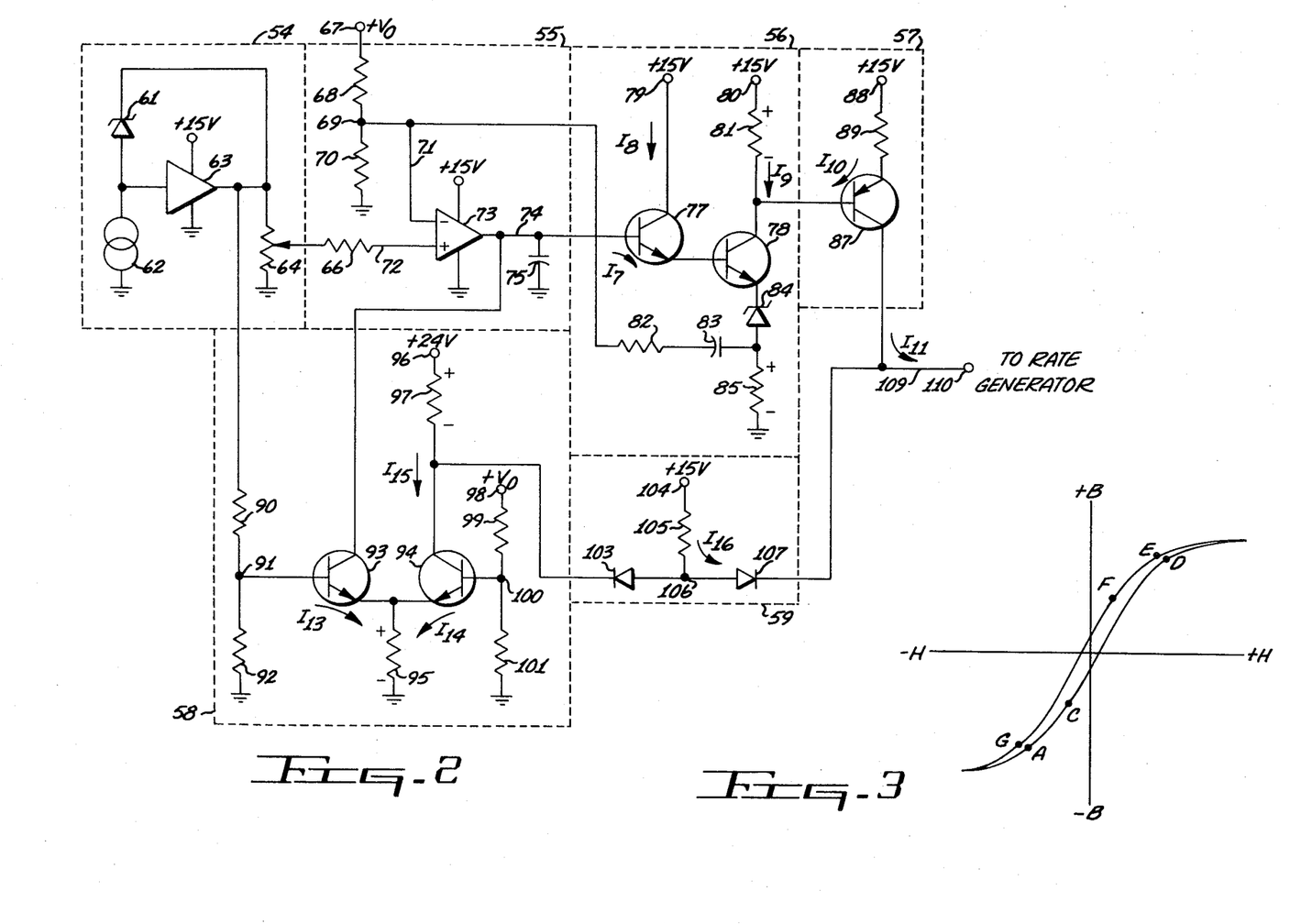
FIG. 2 is a schematic drawing of an embodiment of the present invention.
FIG. 3 illustrates a magnetization curve which is useful in explaining the operation of the circuits shown in FIG. 1.

The magnetic core employed in transformers 25 and 26 produces the magnetization characteristics illustrated in the magnetization curve of FIG. 3. The magnetizing force H is equal to the product of the number of turns in a winding on the transformer core and the number of amperes of current for each turn of wire divided by the length of the core. Since the physical length of the particular transformer core is constant the magnetizing force of the transformer is often expressed as the number of amperes times the number of turns, or "ampere - turns." The flux density B is the number of lines of flux per square centimeter of the transformer core and is determined by the value of the magnetizing force and the type of material used in the core. A discussion of the magnetization curves can be found in the text book "Magnetic Circuits and Transformers" by E. E. Staff, M.I.T., 1943, published by John Wiley & Sons, New York, New York.

Figure 4:
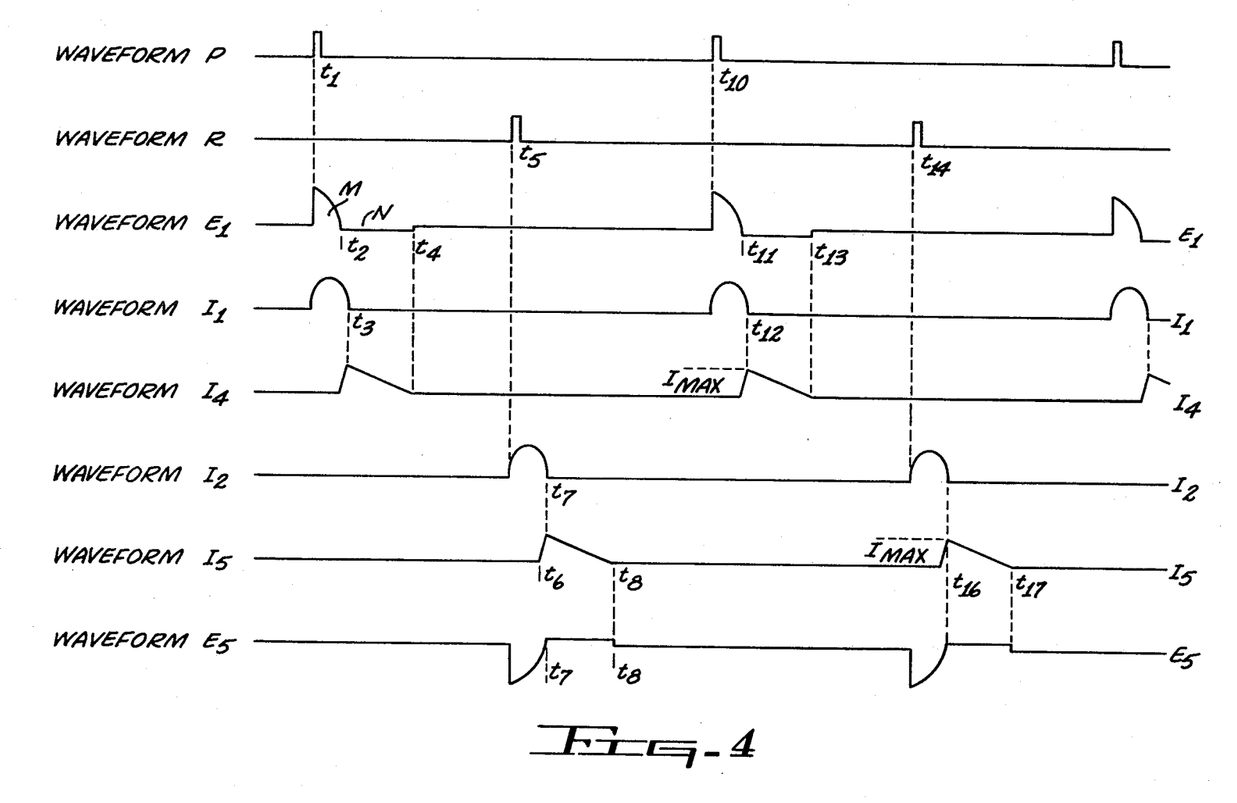
FIG. 4 illustrates waveforms which are useful in explaining the present invention.

The operation of the circuit of FIG. 1 will now be discussed in connection with the magnetization curve shown in FIG. 3 and the waveforms shown in FIG. 4.

A pair of capacitors 40 and 41 provide predetermined quantities of electrical energy to the transformers 25 and 26 each time one of the silicon control rectifiers 33 and 34 is rendered conductive. Each time one of the silicon controlled rectifiers 33 and 34 is rendered nonconductive the same predetermined quantity of energy is delivered by one of the transformers 25 and 26 through diodes 43 and 44 to a filter capacitor 48. Prior to the time $t_1$ shown in FIG. 4, capacitor 40 of FIG. 1 is charged to the polarity shown in FIG. 1. At time $t_1$ a pulse from trigger generator 14 renders silicon control rectifier 33 conductive so that the voltage across the capacitor 40 is supplied to the primary winding 28 of transformer 25 causing a current $I_1$ to flow from the upper plate of capacitor 40 through to anode to cathode of rectifier 33, through the primary winding 28 to the lower plate of capacitor 40. The current $I_1$ through primary winding 28 causes a change of flux in the transformer core and causes the operating point to move from point A toward point C of the magnetization curve in FIG. 3. This change in flux produces a voltage across primary winding 28, which limits the rate of increase in current through silicon controlled rectifier 33, thus preventing possible damage to rectifier 33. A positive voltage applied to the upper end of primary winding 28 causes the operating point to move upward from point C toward point D. The distance between point C and point D is proportional to the product of the voltage applied to primary winding 28 and the duration of time this voltage is applied.

The voltage applied to the primary winding 28 is magnetically coupled through the transformer core to the secondary winding 29. Between time $t_1$ and time $t_2$ secondary winding 29 has a positive polarity of voltage at the lower end of the winding and a negative polarity of voltage at the upper end of the winding. At this time, the voltage across the secondary winding 29 causes diode 43 to be back biased so that no current flows through the diode or through the secondary winding 28. Capacitor 40 provides current $I_1$ until this capacitor has discharged at time $t_2$ as shown in waveform $I_1$ of FIG. 4. The area M under the curve of waveform $E_1$ (FIG. 4) between time $t_1$ and $t_2$ is the sum of the products of the voltage applied to primary winding 28 and the duration of the time the voltage is applied and this area M represents the total energy stored in the core of transformer 25. When the voltage applied to primary winding 28 has a zero value at time $t_2$, the operating point reaches point D.

At time $t_2$, the energy stored in the core of transformer 25 reverses the polarity of voltage across each of the transformer windings so that negative polarity of voltage is developed at the upper end of primary winding 28. This negative polarity of voltage at the upper end of primary winding 28 causes the operating point in FIG. 3 to move from point D toward point E and to begin moving toward point A. Again the distance between point E and point A is proportional to the product of the voltage across primary winding 28 and the duration of time this voltage is applied. The area N under the curve of waveform $E_1$ between times $t_2$ and $t_4$ is the sum of the products of voltage across primary winding 28 and the time this voltage is applied. In this area N represents a total energy which the core of transformer 28 returns through the transformer. The voltage across primary winding 28 causes current $I_1$ to charge capacitor 40 to a polarity opposite to the polarity shown in FIG. 1.

The energy in the core of transformer 25 causes the voltage across secondary winding 29 to increase to a value larger than the voltage across filter capacitor 48 so that a current $I_4$ flows through diode 43 to charge capacitor 48. The energy which is stored in the core of the transformer 25 when silicon controlled rectifier 33 conducts is proportional to the difference between the flux at point A and point D on the magnetization curve of FIG. 3; and the energy which is transferred to the secondary winding 29 when silicon controlled rectifier 33 is rendered nonconductive, is proportional to the difference between the flux at point E and point A.

Since the distance between point A through point C to point D shown in FIG. 3 is substantially the same as the distance between points E through point F to point A, substantially all of the energy which was stored in the core of the transformer between times $t_1$ and $t_2$ is returned and is stored in capacitors 48 and 49. Capacitor 40 delivers substantially the same amount of energy to the transformer each time the silicon controlled rectifier 33 is rendered conductive so that the amount of energy delivered to filter capacitors 48 and 49 and the voltage across these capacitors is determined by the frequency of the signals applied to the gate of rectifier 33.

Capacitor 41 also provides a predetermined quantity of energy to the transformer 26 each time silicon controlled rectifier 34 is rendered conductive. A more detailed description of the operation of the switching regulator can be found in the U.S. Pat. No. 3,518,526 by Luther L. Genuit, issued June 30, 1970, entitled "-Switching Regulator."

Prior to time $t_5$, capacitor 41 is charged to the polarity shown in FIG. 1. At time $t_5$ a pulse from the trigger generator 14 renders silicon controlled rectifier 34 conductive so that current $I_2$ flows from the upper plate of capacitor 41 through the primary winding 30, from anode to cathode of rectifier 34 to the lower plate of capacitor 41. Current $I_2$ through the primary winding and the voltages impressed across this winding cause the operating point of the characteristic curve in FIG. 3 to move from point A through point C to point D and causing a predetermined quantity of energy to be stored in the core of transformer 26. When silicon controlled rectifier 34 is rendered nonconductive, this energy is transferred through the secondary winding 31 causing a current $I_5$ to charge capacitor 48 as described above.

The amount of voltage across the capacitors 48 and 49 can be controlled by controlling the frequency of the trigger signals which trigger generator 14 applies to the gates of silicon controlled rectifiers 33 and 34. The frequency of the trigger signals is determined by the value of the current applied to the rate generator 15. When an increase in the amount of current drawn by a load (not shown) connected across the output terminals 51 and 52 in FIG. 1 causes the value of the output voltage to fall below a predetermined reference level, the frequency of the signals from trigger generator 14 increases. This increase in the frequency of the output signals causes an increase in the rate of energy delivered to filter capacitors 48 and 49 and increases the voltage at the output terminal 51 of the power supply controls the frequency of the signal from the trigger generator 14 so that the voltage at the output terminals 51 and 52 is substantially constant even when the current drawn from this power supply varies over a wide range of values.

Error Amplifier

As indicated in FIG. 2, the error amplifier comprises a constant voltage source 54, a difference amplifier 55, an intermediate amplifier 56, a current amplifier 57, a comparator 58, and a minimum current circuit 59. Amplifier 55 includes a differential amplifier 73 having first and second input leads and an output lead. The voltage received at the first input lead 71 is compared with the voltage received at the second input lead 72 and the differential amplifier produces a voltage at output lead 74 which is determined by the difference between the voltages at the first and second input leads. When the voltage at the first input lead 71 increases or becomes more positive the voltage at the output lead 74 decreases. The voltage on output lead 74 can be adjusted by controlling the value of the voltage on input lead 72. The voltage on lead 72 can be controlled by the setting of the potentiometer 64 in the constant voltage source 54. The value of the voltage on output lead 74 of the differential amplifier determines the conductivity of transistors 77, 78 and 87 and determines the value of current to the output lead 109 of the error amplifier.

Terminal 67 of amplifier 55 is connected to the voltage output terminal 51 (FIG. 1) of the switching regulator. Resistors 68 and 70 comprise a voltage divider network which determines the value of the voltage at junction point 69 and on the input lead 71 of amplifier 73. In a typical circuit the values of resistors 68 and 70 are chosen so that a voltage $+V_o$, from the switching regulator, of +5 volts provide a voltage of +4.5 volts at junction point 69.

When the value of voltage on input lead 71 of amplifier 73 approaches a value of +4.5 volts the voltage on the output lead 74 causes a current $I_7$ to flow from the base to emitter of transistor 77, from the base to emitter of transistor 78, through zener diode 84 and resistor 85 to ground. Current $I_7$ renders transistor 77 conductive so that a current $I_8$ flows from terminal 79 through collector to emitter of transistor 77, from base to emitter of transistor 78, through zener diode 84 and resistor 85 to ground. Currents $I_7$ and $I_8$ from base to emitter of transistor 78 render transistor 78 conductive so that a larger current $I_9$ flows from terminal 80 through resistor 81, from collector to emitter of transistor 78, through zener diode 84 and resistor 85 to ground. Current $I_9$ through resistor 81 provides a voltage drop of the polarity shown across resistor 81 so that the voltage at the collector of transistor 78 decreases. The lower value of voltage at the collector of transistor 78 causes a current $I_{10}$ to flow from terminal 88 through resistor 89, from emitter to base of transistor 87 through transistor 78, zener diode 84 and resistor 85 to ground. Current $I_{10}$ renders transistor 87 conductive so that a current $I_{11}$ flows from terminal 88 through resistor 89 from emitter to collector of transistor 87 to output lead 109 and to the rate generator shown in FIG. 1. Current $I_{11}$ to the rate generator causes the rate generator to develop pulses for the trigger generator 14 (FIG. 1) and causes the output voltage from the switching regulator of FIG. 1 to remain at approximately +5 volts.

When the voltage $+V_o$ of the switching regulator decreases the voltage on input lead 71 of the differential amplifier 73 decreases so that the voltage at the output lead 74 increases. An increase in voltage on output lead 71 causes current $I_7$ through transistor 77 to increase so that the conductivity of transistor 77 increases thereby causing current $I_8$ to increase. When current $I_8$ increases this causes an increase in the conductivity of transistor 78 so that the current $I_9$ through transistor 78 increases thereby causing an increase in the voltage drop across resistor 81 and decreasing the voltage at the collector of transistor 78. A decrease in the voltage at the collector of transistor 78 causes an increase in the emitter to base current $I_{10}$ of transistor 87 thereby increasing the conductivity of transistor 87 so that current $I_{11}$ to the rate generator increases. When the current $I_{11}$ to the rate generator increases the frequency of the pulses supplied by rate generator 15 and trigger generator 14 increases. This increase in the frequency of the trigger signals from trigger generator 14 causes an increase in the rate of the energy delivered to the output filter capacitors 48 and 49 of the switching regulator and causes the voltage at the output terminals 51 and 52 to return to the predetermined reference level.

In prior art error amplifiers a sudden decrease in the voltage $+V_o$ from the switching regulator could cause the voltage at the output lead 74 of the differential amplifier 73 to increase rapidly thereby causing currents $I_7$, $I_8$, $I_9$, $I_{10}$ and $I_{11}$ to increase rapidly. The rapid increase of current $I_{11}$ could cause an excessively large increase in the frequency of the pulses produced by rate generator 15 and trigger generator 14 of FIG. 1.

When the frequency of the pulses from trigger generator 14 is too high the silicon controlled rectifiers of FIG. 1 may be damaged. The reason for possible damage rectifiers of FIG. 1 will now be discussed in connection with the waveform shown in FIG. 4. When the frequency of the pulses from the trigger generator increase the time duration between the pulses decreases. For example, when the frequency increases the relative positions of the pulses shown in waveform P and waveform R of FIG. 4 change so that the time duration between the time $t_1$ and time $t_5$ decreases. The pulse at time $t_1$ causes a silicon controlled rectifier 33 to fire from time $t_1$ to the time $t_3$ as shown in waveform $I_1$. The pulse at time $t_5$ in waveform R causes silicon controlled rectifier 34 to fire from a time $t_5$ to a time $t_7$ as shown in waveform $I_2$. If the time difference between time $t_1$ and time $t_5$ should decrease so that the first pulse in waveform R occurs before time $t_3$, the silicon controlled rectifiers 33 and 34 would both be conducting at the same time. When silicon controlled rectifiers 33 and 34 are both conducting at the same time there is a low impedance between the terminals 36 and 37 of the switching regulator shown in FIG. 1. This low impedance will cause a high current to flow from terminal 36 through silicon controlled rectifier 33, primary windings 28 and 30 and silicon controlled rectifier 34 to terminal 37. This high current through the silicon controlled rectifiers could cause possible damage to silicon controlled rectifiers 33 and 34.

A feedback circuit in the present invention comprising resistors 82, capacitor 83 and a resistor 85 of the intermediate amplifier prevents a sudden drop in the voltage $+V_o$ from causing a sudden increase in the current $I_{11}$ from the error amplifier. When current $I_9$ through resistor 85 increases the voltage across resistor 85 increases. This increase in voltage across resistor 85 is coupled through capacitor 83 and resistor 82 to the input lead 71 of the differential amplifier 73. This increase in voltage from resistor 85 cancels a portion of the decrease in the voltage $+V_o$ so that the total change of voltage at the input lead 71 is greatly reduced. This reduction in the change of voltage on input lead 71 causes a reduction in the change of voltage on output lead 74 of amplifier 73 and causes a reduction in the amount of increase in current $I_{11}$. This slight increase in output current $I_{11}$ causes an increase in the frequency of the pulses applied to the switching regulator but prevents a large increase in frequency which could cause damage to the silicon controlled rectifiers in the switching regulator. The feedback circuit reduces the high frequency gain of the error amplifier and insures increased stability of the voltage from the switching regulator.

The error amplifier shown in FIG. 2 also provides protection for the switching regulator during start-up time and when a short circuit or a low impedance load is connected across the output terminals of the switching regulator. During start-up time and during the time when a low impedance load is across terminals 51 and 52 of the switching regulator of FIG. 1 the voltage $+V_o$ has a low value. If this low value of voltage determines the value of current delivered by the error amplifier the output current $I_{11}$ would be very large. This large value of current would cause the rate generator to develop high frequency pulses which could cause possible damage to the silicon controlled rectifiers as described above. The circuit in FIG. 2 prevents this high current to the rate generator when $+V_o$ is low by providing a comparator circuit 15 which disables the differential amplifier during the time when the $+V_o$ is very low. At this time a current for the rate generator is provided by the minimum current circuit 16 which supplies some current to the rate generator but does not supply sufficient current to cause the frequency of the rate generator to be excessively high.

When the voltage $+V_o$ from the switching regulator and at terminal 98 of comparator 58 is low transistor 94 is rendered nonconductive. At this time a positive voltage at the output lead of amplifier 63 in the constant current source 54 causes the voltage at the base of transistor 93 to be more positive than the voltage at the base of transistor 94. The voltage at the base of transistor 93 causes a current $I_{13}$ to flow from the base to emitter of transistor 93 and through resistor 95 to ground. Current $I_{13}$ through base to emitter of transistor 93 renders transistor 93 conductive so that the impedance between the collector and the emitter of transistor 93 is relatively low. This low impedance in transistor 93 causes current to flow from output lead 74 of amplifier 73 through transistor 93 and resistor 95 to ground. Current through resistor 95 provides a voltage drop of the polarity shown across resistor 95. The voltage drop across resistor 95 causes the voltage at the emitter of transistor 94 to be more positive than the voltage at the base so that transistor 95 is nonconductive. The low impedance in transistor 93 causes the voltage on the output lead 74 of the differential amplifier 73 to be relatively low. When the voltage at the output lead 74 of the differential amplifier is low transistor 77 in the intermediate amplifier is rendered nonconductive. When transistor 77 is rendered nonconductive transistor 78 and transistor 87 are rendered nonconductive so that the current $I_{11}$ no longer flows to the rate generator. A current $I_{16}$ flows from terminal 104 in the minimum current circuit 59 through resistor 105 and diode 107 to the output lead 109 and current output terminal 110. This current $I_{16}$ supplies the current for the rate generator. Resistor 105 limits the value of current $I_{16}$ and prevents the generation of high frequency pulses which could cause damage to the silicon controlled rectifiers in the switching regulator FIG. 1.

When the voltage $+V_o$ at the output of the switching regulator increases to near the normal value, the voltage at terminal 98 in comparator 58 causes a current $I_{14}$ to flow from terminal 98 through resistor 99, from base to emitter of transistor 94 through resistor 95 to ground. Current $I_{14}$ renders transistor 94 conductive so that a current $I_{15}$ flows from terminal 96 through resistor 97 from collector to emitter of transistor 94 through resistor 95 to ground. Current $I_{15}$ produces a relatively large voltage drop of the polarity shown across resistor 95 so that the emitter of transistor 93 is more positive than the base causing transistor 93 to be rendered nonconductive. When transistor 93 is rendered nonconductive the impedance between the output lead of the differential amplifier and ground is high so that the voltage at output lead 74 of the differential amplifier again causes the current $I_7$ to render transistors 77, 78 and 87 conductive and to control the amount of current supplied to the rate generator.

When transistor 94 in the comparator 58 is rendered conductive the current $I_{15}$ produces a voltage drop of the polarity shown across resistor 97 so that the voltage at the collector of transistor 94 decreases thereby causing the voltage at the junction point 106 in the minimum current circuit 59 to decrease. At this same time the transistor 87 is rendered conductive so that the voltage on the output lead 109 increases to a value of voltage greater than the voltage at junction point 106. This causes the current $I_{16}$ through resistor 105 and diode 107 to decrease to a value of zero. Thus, the only current to the rate generator at this time is current $I_{11}$ through transistor 87.

Thus, it can be seen that during normal operations the voltage $+V_o$ from the output of the switching regulator causes the differential amplifier 73, the intermediate amplifier 56, and the current amplifier 57 to provide the current which determines the frequency of the pulses developed by the rate generator 15 of FIG. 1. When the output voltage $+V_o$ from the switching regulator decreases below a predetermined value the differential amplifier 73 is rendered inoperative and the current to the rate generator is supplied by the minimum current circuit 59 of FIG. 2. This provides protection for the switching regulator during start-up and short-circuit conditions in the switching regulator. The feedback circuit comprising resistor 82, capacitor 83 and resistor 85 provide protection for the switching regulator when the output voltage decreases suddenly.

While the principles of the invention have now been made clear in an illustrative embodiment, there will be many obvious modifications of the structure, arrangement, proportions, and components, without departing from those principles. The appended claims are intended to cover any such modifications within the scope of the invention.

What is claimed is:

1. An error amplifier for sensing the voltage at the output terminal of a switching regulator and for providing a current having a value which is determined by the voltage from the regulator, said error amplifier comprising:
   a constant voltage source;
   a differential amplifier having first and second input leads and an output lead;
   means for coupling said first input lead of said differential amplifier to said output terminal of said regulator, said second input lead of said differential amplifier being coupled to said source;
   a current amplifier having an input lead and an output lead, said input lead of said current amplifier being coupled to said output lead of said differential amplifier;
   a comparator having first and second input leads and first and second output leads, said comparator having impedances at said first and said second output leads which are determined by the value of voltages on said first and said second input terminals, said first input lead of said comparator being coupled to said output terminal of said regulator, said second input lead of said comparator being connected to said source, said first output lead of said comparator being connected to said output lead of said differential amplifier; and
   a minimum current circuit having an input lead and an output lead, said input lead of said circuit being connected to said second output lead of said comparator, said output lead of said circuit being connected to said output lead of said current amplifier.

2. An error amplifier as defined in claim 1 including:
   feedback means, said feedback means being connected between said output lead of said differential amplifier and said first input lead of said differential amplifier, said feedback means providing a signal to said first input lead of said differential amplifier to prevent sudden changes in voltage from the switching regulator from causing large changes in the value of current provided by the error amplifier.

3. An error amplifier as defined in claim 1 including:
   an intermediate amplifier having an input lead and first and second output leads, said first and said second output leads providing signals having opposite phases, said input lead of said intermediate amplifier being connected to said output lead of said differential amplifier, said first output lead of said intermediate amplifier being connected to said input lead of said current amplifier, said second output lead of said intermediate amplifier being connected to said first input lead of said differential amplifier.

4. An error amplifier for sensing the voltage at the output terminal of a switching regulator and for providing a current having a value which is determined by the voltage from the regulator, said error amplifier comprising:
   a constant voltage source;
   a differential amplifier having first and second input leads and an output lead;
   means for coupling said first input lead of said differential amplifier to said output terminal of said regulator, said second input lead of said differential amplifier being coupled to said source;
   first and second reference potentials; first, second and third transistors each having a base, a collector and an emitter, said collector of said first transistor being connected to said first potential, said base of said first transistor being coupled to said output lead of said differential amplifier, said emitter of said first transistor being connected to said base of said second transistor;
   first, second and third resistors, said first resistor being connected between said first potential and said collector of said second transistor, said collector of said second transistor being connected to said base of said third transistor, said second resistor being connected between said first potential and said emitter of said third transistor, a first end of said third resistor being connected to said second potential;
   a zener diode, said zener diode being connected to said emitter of said second transistor and a second end of said third resistor;
   a capacitor, said capacitor being connected between said second end of said third resistor and said first input lead of said differential amplifier;
   a current output terminal, said current output terminal being connected to said collector of said third transistor;
   a comparator having first and second input leads and first and second output leads, said comparator having impedances at said first and said second output leads which are determined by the value of voltages on said first and said second input terminals, said first input lead of said comparator being coupled to said output terminal of said regulator, said second input lead of said comparator being connected to said source, said first output lead of said comparator being connected to said base of said first transistor; and
   a minimum current circuit having an input lead and an output lead, said input lead of said circuit being connected to said second output lead of said comparator, said output lead of said circuit being connected to said current output terminal.

5. An error amplifier as defined in claim 4 wherein said comparator includes:
   fourth and fifth transistors each having a base, a collector and an emitter, said base of said fourth transistor being connected to said second input lead of said comparator, said base of said fifth transistor being connected to said first input lead of said comparator;
   a third reference potential;
   fourth and fifth resistors, said fourth resistor being connected between said third potential and said collector of said fifth transistor, said collector of said fourth transistor being connected to said first output of the comparator, said second output lead of said comparator being connected to said collector of said fifth transistor, said fifth resistor being connected between said second potential and said emitters of said fourth and said fifth transistors.

6. An error amplifier as defined in claim 4 wherein said minimum current circuit comprises:
   first and second diodes, each having an anode and a cathode; and
   a sixth resistor, said sixth resistor being connected between said first potential and said anodes of said first and said second diodes, said cathode of said first diode being connected to said second output lead of said comparator, said cathode of said second diode being connected to said current output terminal.

7. An error amplifier for sensing the voltage at the output terminal of a switching regulator and for providing a current having a value which is determined by the voltage from the regulator, said error amplifier comprising:

a constant voltage source;

a differential amplifier having first and second input leads and an output lead;

means for coupling said first input lead of said differential amplifier to said output terminal of said regulator, said second input lead of said differential amplifier being coupled to said source;

first, second, third, fourth and fifth transistors each having a base, a collector and an emitter, said base of said first transistor being connected to said output lead of said differential amplifier, said emitter of said first transistor being connected to said base of said second transistor, said base of said third transistor being connected to said collector of said second transistor;

first, second and third reference potentials, said collector of said first transistor being connected to said first potential;

first, second, third, fourth, fifth, and sixth resistors, said first resistor being connected between said first potential and said collector of said second transistor, said second resistor being connected between said first potential and said emitter of said third transistor, said base of said fourth transistor being coupled to said source, said base of said fifth transistor being coupled to said output terminal of said regulator, said collector of said fourth transistor being connected to said base of said first transistor, said fourth resistor being connected between said third potential and said collector of said fifth transistor;

a zener diode, a first end of said third resistor being connected to said second potential, said zener diode being connected between a second end of said third resistor and said emitter of said second transistor, said fifth resistor being connected between said second potential and said emitters of said fourth and said fifth transistors;

a current output terminal, said current output terminal being connected to said collector of said third transistor;

a capacitor, said capacitor being connected between said second end of said third resistor and said first input lead of said differential amplifier; and first and second diodes each having an anode and a cathode, said sixth resistor being connected between said first potential and said anodes of said first and said second diodes, said cathode of said first diode being connected to said collector of said fifth transistor, said cathode of said second diode being connected to said collector of said third transistor.

8. An error amplifier as defined in claim 7 including:

means for setting the value of voltage at the output terminal of said switching regulator, said means for setting being connected between said constant voltage source and said second input lead of said differential amplifier, said means for setting supplying an adjustable voltage to said second input lead of said differential amplifier, said adjustable voltage determining the average value of current supplied by said error amplifier.

* * * * *